United States Patent [19]

Berger

[11] 4,083,588
[45] Apr. 11, 1978

[54] COUPLING

[76] Inventor: William L. Berger, 5210 Clinton Dr., Erie, Pa. 16509

[21] Appl. No.: 767,687

[22] Filed: Feb. 11, 1977

[51] Int. Cl.² ............................................. F16L 21/06
[52] U.S. Cl. ..................................... 285/373; 24/279; 138/99
[58] Field of Search .................. 285/373, 419; 138/99; 24/279

[56] References Cited

U.S. PATENT DOCUMENTS

| 627,987 | 7/1899 | Dick | 285/419 X |
|---|---|---|---|
| 2,227,551 | 1/1941 | Morris | 285/373 |
| 3,088,185 | 5/1963 | Smith | 285/373 X |
| 3,341,232 | 9/1967 | Deakins | 285/373 |
| 3,916,489 | 11/1975 | Berger | 285/373 X |
| 3,944,265 | 3/1976 | Hiemstra et al. | 285/419 |

FOREIGN PATENT DOCUMENTS

| 1,282,373 | 11/1968 | Germany | 285/373 |

Primary Examiner—Thomas F. Callaghan
Attorney, Agent, or Firm—Charles L. Lovercheck

[57] ABSTRACT

A coupling or clamp for clamping a tube or a pipe. The coupling is made up of an elongated band surrounding a gasket. Two laterally spaced notches are formed in one end of the band and strikes are fixed to the other end of the band and disposed in the notches. The ends of the band on each side of the notches are bent back on themselves forming eyelets which receive a yoke. The yoke has a curved intermediate part that has a weld nut welded in it and a screw extends through the weld nut. The end of the screw engages the strike. When the screw is swung to a position generally parallel to the diameter of the tube, its end can engage the strike. Then as the screw is swung to a position tangent to the pipe, its toggle action exerts a preliminary tension on the band. Final tension is accomplished by operating the screw in a conventional manner.

4 Claims, 2 Drawing Figures

COUPLING

REFERENCE TO PRIOR ART

This application constitutes an improvement over U.S. Pat. No. 3,916,489 issued on Nov. 4, 1975 which shows a single coupling and U.S. Pat. No. 3,565,468 which shows a coupling having two separate bands surrounding a metal belt.

OBJECTS OF THE INVENTION

It is an object of the invention to provide an improved coupling.

Another object of the invention is to provide a coupling that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of constuction without departing from the spirit or sacrificing any of the advantages of the invention.

GENERAL DESCRIPTION OF THE DRAWINGS

DETAILED DESCRIPTION OF THE DRAWINGS

Figure 1:
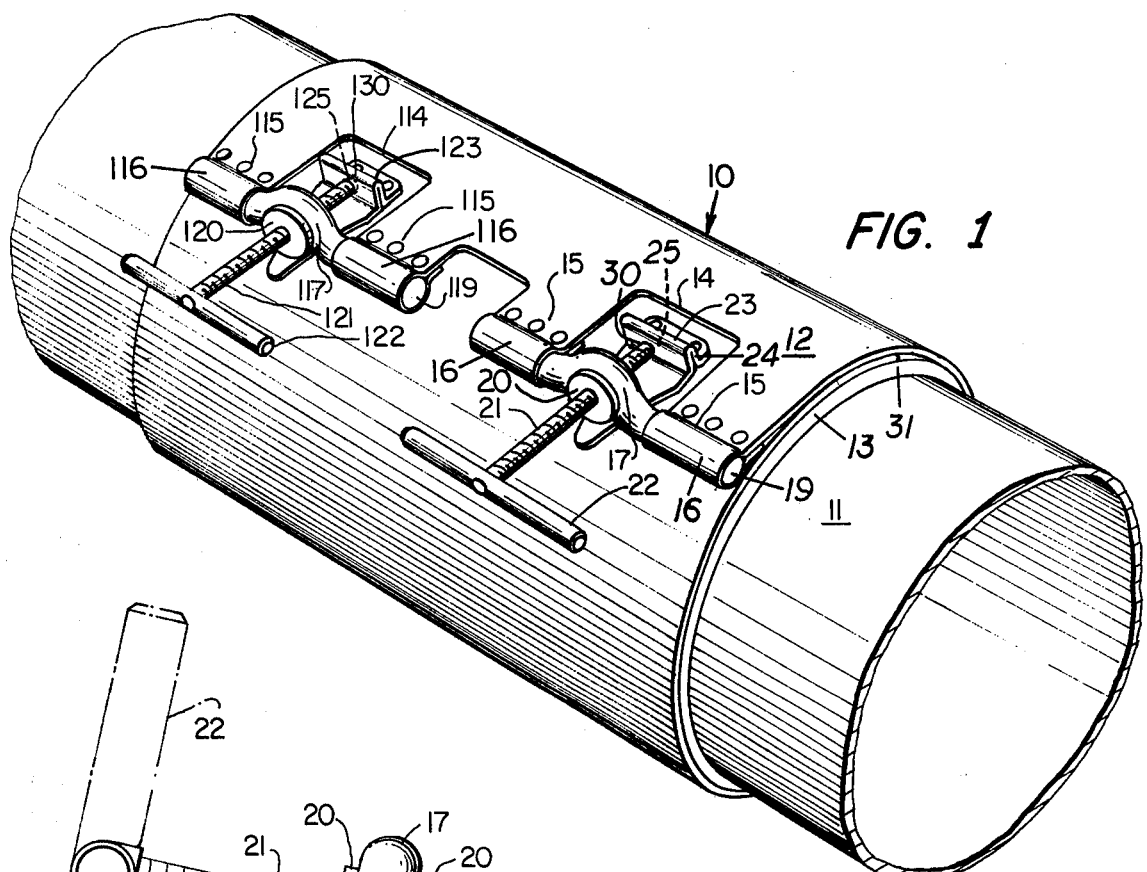
FIG. 1 is an isometric view of the coupling according to the invention.

Now, with more particular reference to the drawings, a clamp-type coupling 10 is disclosed for use with tubes or pipes, for example, pipe 11. The coupling is made up generally of a tensioning band 12 that surrounds a gasket 13. The band 12 has an end 31 and an end having eyelets 16 and 116 that are formed in the end and overlap the end 31. The tensioning band has notches 14 and 114 formed in one end and ears 15 and 115 on each side of the notches are bent back on themselves forming the eyelets 16 and 116. The eyelets 16 and 116 receive the ends 19 and 119 of the yokes 17 and 117. The weld nuts 20 and 120 are welded into the curved part of the yokes 17 and 117 and the screws 21 and 121 are threaded into the weld nuts 20 and 120. The screws 21 and 121 have handles 22 and 122 staked to them. The ends of the screws terminate in hemispherical-shaped ends 30 and 130 that are received in the cavities 25 and 125 in the strikes 23 and 123. The strikes 23 and 123 are fixed to the end 31 by spot-welds as shown or other well-known fastening means and the notches are slightly wider than the strikes so that the strikes can move freely in the notches 14 and 114. In the example shown, the strike may be made of a sheet of material similar to that from which the band 12 is made. The sheet material is folded back on itself at 24 forming the outwardly extending portion which terminate at the ends shown.

In operation, the gasket 13 and the tensioning band 12 are placed around a pipe 11. The rounded end 30 of the screw 21 is placed in the cavity 25 against the strike 23 with the screw 21 inclined to the diameter of the pipe.

Figure 2:
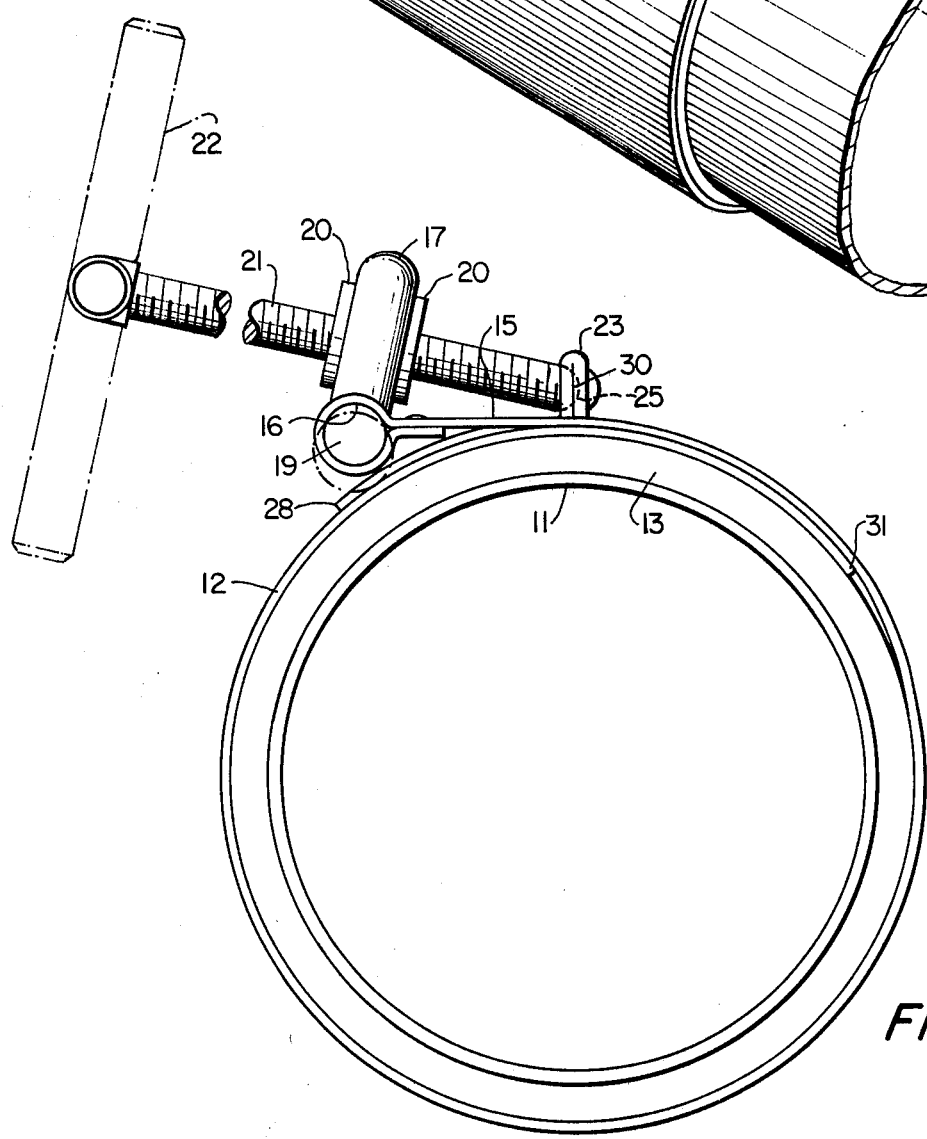
FIG. 2 is an end view of the coupling.

The rounded end 130 of the screw 121 will then be placed in the cavity 125 against the strike 123 with the screw 121 parallel to a diameter of the tube or pipe 11. The screws 21 and 121 will then be swung to the position shown in FIGS. 1 and 2. This will preliminarily tension the band evenly along its length. The operator may then rotate the screws 21 and 121 alternately or simultaneously by means of the handles 22 and 122 further tightening the tensioning band. As torque is applied through screws 21 and 121 gasket 13 is compressed to seal around pipe 11. It will be noted that when the eyelets 16 and 116 come inclose proximity to the outer periphery of the tensioning band as shown in FIG. 2, with the screw tangent to the pipe, the center of the ends 19 of the yoke 17 will be between the tangent line to the screw 21 at the outer periphery of the tensioning band 12, thus, providing a toggle action.

No tools are required with my invention. The purposed apparatus is more economical to manufacture than the band seal pipe coupling shown in U.S. Pat. No. 3,565,468. Clamping force is distributed in this patent thereby compressing the gasket uniformly by tightening the two separate bands. In the present application, one piece, continuous circumferential band is provided overlapping the gasket as opposed to the band seal design which incorporates a spanner bridging an open space. Over center locking feature incorporated with the design prevents accidental loosening. This design can be wrapped around existing lines, joints or points along a line where leaks are occurring. The active lengths of these screws are in compression whereas in the band seal pipe coupling they are in tension.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling for a tube, pipe or the like comprising,
    a tensioning band made up of flexible, relatively thin material adapted to lay on the outside surface of a pipe or tube,
    said tensioning band is disposed around a gasket,
    said tensioning band having a first notch and a second notch spaced from each other,
    a third notch between said first notch and said second notch,
    all said notches being formed in one end of said band,
    the ends of the material defining each said notch having their ends rolled back forming eyelets,
    yokes each having a curved intermediate part and two straight end parts,
    said ends being rotatably received in said eyelets,
    nuts having one side fixed to the inside curve of the intermediate part of said yoke,
    said two straight end parts extending outwardly from said intermediate part and being disposed on a line passing on the opposite sides of said nuts from said one side,
    said nuts receiving a screw,
    strikes on the end of said band opposite said notches,
    said strikes comprising pieces of sheet material slightly narrower than said notches, and having an intermediate part thereof bent back on itself forming an outwardly extending portion extending generally radially of said coupling,
    the ends of said strikes resting on said band and extending from said outwardly extending portion a substantial distance and terminating short of the end of said band, said strikes having seats formed on said outwardly extending parts each adapted to engage an end of a screw, said screws being adapted to be swung with said yokes to a position parallel to a diameter of said pipe having the end of said screws engage said seats, said screws being adapted to be swung to a position tangent to said pipe at said strikes and said yokes disposed between a line passing through said screws parallel to the axis of said pipe and the outer periphery of said band whereby the said tensioning band is preliminarily tensioned, said screws being adapted to be tightened by rotating said screws in said nuts with said eyelets swing into engagement with said band whereby said tensioning band is tensioned and said coupling is held in closed position by toggle action of said screw and said yoke.

2. The coupling recited in claim 1 wherein said ends of said band overlap each other and, said screws have a hemispherical shaped end and said seat in said strike has a complementary shaped seat for receiving said screw end.

3. The coupling recited in claim 1 wherein said tensioning band engages said gasket from end to end whereby said gasket material is compressed to fully seal about said pipe or tub joint or crack.

4. The coupling recited in claim 1 wherein said tensioning band may be used without said gasket to physically bridge a pipe or tube joint thereby clamping the joint securely.

* * * * *